(12) United States Patent
Loebig et al.

(10) Patent No.: US 10,316,750 B2
(45) Date of Patent: Jun. 11, 2019

(54) SINGLE PHASE MICRO/MINI CHANNEL HEAT EXCHANGERS FOR GAS TURBINE INTERCOOLING

(71) Applicants: Rolls-Royce Corporation, Indianapolis, IN (US); Rolls-Royce North American Technologies, Inc., Indianapolis, IN (US)

(72) Inventors: James C. Loebig, Greenwood, IN (US); Emil R. Dejulio, Columbus, IN (US); Eric S. Donovan, Fishers, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 386 days.

(21) Appl. No.: 14/625,133

(22) Filed: Feb. 18, 2015

(65) Prior Publication Data

US 2015/0240722 A1 Aug. 27, 2015

Related U.S. Application Data

(60) Provisional application No. 61/943,035, filed on Feb. 21, 2014.

(51) Int. Cl.
*F02C 3/04* (2006.01)
*F02C 7/18* (2006.01)
(Continued)

(52) U.S. Cl.
CPC .................. *F02C 7/18* (2013.01); *F02C 3/04* (2013.01); *F02C 7/143* (2013.01); *F02K 3/115* (2013.01);
(Continued)

(58) Field of Classification Search
CPC .... F02C 7/18; F02C 3/04; F02C 7/143; F02C 7/125; F02C 7/185; F02C 7/16;
(Continued)

(56) References Cited

U.S. PATENT DOCUMENTS 2,782,009 A * 2/1957 Rippingille ........... F28D 9/0062
165/153
3,818,984 A * 6/1974 Nakamura ............ F28D 9/0018
165/157
(Continued)

FOREIGN PATENT DOCUMENTS

CH 243957 A 8/1946
EP 2412631 A2 2/2012
(Continued)

OTHER PUBLICATIONS

Extended European Search Report dated Jul. 9, 2015.

*Primary Examiner* — Orlando E Aviles
*Assistant Examiner* — Miguel A Diaz
(74) *Attorney, Agent, or Firm* — Fishman Stewart PLLC

(57) ABSTRACT

A gas turbine engine heat exchange system including a first multi-width channel heat exchanger (MWCHX) configured to transfer heat between a first air stream and a heat transfer fluid. The first MWCHX includes a first plurality of air-passage mini-channels configured to allow passage of the first air stream therethrough, where each air-passage channel has an air-channel width and an air-channel length greater than the air-channel width. The MWCHX also includes a first plurality of heat transfer fluid channels configured to allow passage of the heat transfer fluid therethrough, where each heat transfer fluid channel has a heat transfer channel width and a heat transfer channel length greater than the heat transfer channel width. The heat transfer channel width is less than the air-channel width.

20 Claims, 5 Drawing Sheets

(51) Int. Cl.
| | |
|---|---|
| *F02C 7/143* | (2006.01) |
| *F02K 3/115* | (2006.01) |
| *F28D 9/00* | (2006.01) |
| *F02M 31/08* | (2006.01) |
| *F28F 3/04* | (2006.01) |
| *F28F 9/02* | (2006.01) |
| *F28D 21/00* | (2006.01) |

(52) U.S. Cl.
CPC ............ *F28D 9/0037* (2013.01); *F28F 3/048* (2013.01); *F28F 9/026* (2013.01); *F05D 2220/3219* (2013.01); *F05D 2230/11* (2013.01); *F05D 2260/204* (2013.01); *F28D 2021/0026* (2013.01); *F28F 2250/06* (2013.01); *F28F 2260/02* (2013.01); *F28F 2275/061* (2013.01)

(58) Field of Classification Search
CPC ........ F28F 9/026; F28F 3/048; F28F 2260/02; F28F 2250/06; F28F 2275/061; F28F 3/005; F28F 3/02; F28F 9/002; F28F 9/26–9/266; F28D 9/0037; F28D 2021/0026; F28D 9/02; F28D 21/0003; F02K 3/115; F02K 3/105; F05D 2260/204; F05D 2230/11; F05D 2220/3219; F05D 2260/205; F05D 2260/207; F05D 2220/32; F05D 2220/323; F05D 2220/72; F05D 2220/74; F05D 2220/62; F05D 2210/13; F05D 2220/762; H01L 23/40; H01L 23/46; H01L 23/467; Y02T 10/126
USPC .................................................. 165/164–167
See application file for complete search history.

(56) References Cited

U.S. PATENT DOCUMENTS

| | | | |
|---|---|---|---|
| 3,866,674 A * | 2/1975 | Tramuta ................ F28D 9/0031 | 165/145 |
| 4,098,330 A | 7/1978 | Flower et al. | |
| 4,438,809 A * | 3/1984 | Papis .................... F28D 9/0018 | 165/166 |
| 4,729,428 A * | 3/1988 | Yasutake ............... F28D 9/0062 | 165/153 |
| 5,931,638 A * | 8/1999 | Krause .................... F01D 5/186 | 415/115 |
| 6,134,880 A | 10/2000 | Yoshinaka | |
| 6,988,367 B2 * | 1/2006 | Thompson, Jr. ........ F01D 5/085 | 60/744 |
| 7,156,159 B2 * | 1/2007 | Lovette ..................... F28F 3/12 | 165/104.33 |
| 7,231,770 B2 | 6/2007 | Epstein | |
| 7,254,950 B2 | 8/2007 | Joshi et al. | |
| 7,775,031 B2 * | 8/2010 | Wood ........................ F02C 7/10 | 165/4 |
| 7,776,031 B2 | 8/2010 | Hartlaub et al. | |
| 8,028,410 B2 * | 10/2011 | Thompson ............ F28D 9/0043 | 165/167 |
| 8,266,888 B2 | 9/2012 | Liu | |
| 8,522,572 B2 | 9/2013 | Coffinberry et al. | |
| 9,279,340 B2 * | 3/2016 | Muthuramalingam ... F02C 7/18 | |
| 9,310,079 B2 * | 4/2016 | Uskert ..................... F23M 5/02 | |
| 9,395,122 B2 * | 7/2016 | Eleftheriou ............. F02C 7/08 | |
| 2004/0055329 A1 * | 3/2004 | Mathias ................. F25J 1/0022 | 62/611 |
| 2004/0055740 A1 * | 3/2004 | Meshenky .......... F02B 29/0462 | 165/125 |
| 2005/0081552 A1 * | 4/2005 | Nilson .................... F28D 15/043 | 62/311 |
| 2007/0224445 A1 * | 9/2007 | Hasegawa .......... B23K 35/0238 | 428/660 |
| 2007/0298486 A1 * | 12/2007 | Arora ................... B01J 19/0093 | 435/287.1 |
| 2008/0104975 A1 | 5/2008 | Gorbounov et al. | |
| 2008/0264094 A1 * | 10/2008 | Campagna ................ F01K 7/16 | 62/402 |
| 2009/0211743 A1 * | 8/2009 | Schrader ............... F28D 1/0426 | 165/173 |
| 2009/0211977 A1 * | 8/2009 | Miller ................... B01D 63/082 | 210/646 |
| 2009/0229794 A1 * | 9/2009 | Schon ........................ F24J 2/12 | 165/104.21 |
| 2009/0326279 A1 * | 12/2009 | Tonkovich ............ B01F 5/0475 | 568/487 |
| 2010/0139900 A1 * | 6/2010 | Thompson ............ F28D 9/0043 | 165/166 |
| 2010/0314088 A1 * | 12/2010 | Yoo ....................... F28D 9/0062 | 165/170 |
| 2010/0326100 A1 | 12/2010 | Taras et al. | |
| 2011/0056668 A1 | 3/2011 | Taras et al. | |
| 2011/0073292 A1 * | 3/2011 | Datta ........................ F28F 1/40 | 165/157 |
| 2011/0146226 A1 * | 6/2011 | Wood ........................ F02C 7/10 | 60/39.511 |
| 2011/0146229 A1 * | 6/2011 | Bajusz .................. F28F 9/0075 | 60/226.1 |
| 2011/0192188 A1 | 8/2011 | Nickey et al. | |
| 2011/0259017 A1 * | 10/2011 | Lacy ....................... F01D 5/186 | 60/806 |
| 2011/0302928 A1 * | 12/2011 | Mudawar ................ F02C 7/224 | 60/782 |
| 2012/0023893 A1 * | 2/2012 | Yoo ......................... B64D 13/06 | 60/39.83 |
| 2012/0175095 A1 * | 7/2012 | Makhlouf ................. F28D 7/04 | 165/173 |
| 2012/0177503 A1 * | 7/2012 | Lee ......................... F01D 5/187 | 416/96 R |
| 2012/0216543 A1 * | 8/2012 | Eleftheriou ............... F02C 7/08 | 60/772 |
| 2012/0266603 A1 * | 10/2012 | Uskert ...................... B32B 5/18 | 60/772 |
| 2012/0291991 A1 * | 11/2012 | Denkenberger ...... B21D 53/045 | 165/81 |
| 2012/0297789 A1 | 11/2012 | Coffinberry | |
| 2013/0094944 A1 * | 4/2013 | Lacy ....................... F01D 5/225 | 415/173.1 |
| 2013/0152392 A1 * | 6/2013 | Swinford ................. B23H 7/02 | 29/890.03 |
| 2014/0079978 A1 * | 3/2014 | Al-Hallaj .......... H01M 10/5048 | 429/120 |
| 2014/0116664 A1 * | 5/2014 | Landre ..................... F28F 3/025 | 165/166 |
| 2014/0196870 A1 * | 7/2014 | Rusich ..................... F28F 3/083 | 165/104.14 |
| 2014/0212628 A1 * | 7/2014 | Lin .......................... F01D 5/288 | 428/172 |
| 2014/0246183 A1 * | 9/2014 | Loebig ................... F28D 9/0068 | 165/166 |
| 2015/0047367 A1 * | 2/2015 | Benignos ................. F02C 7/143 | 60/782 |
| 2015/0101334 A1 * | 4/2015 | Bond ....................... F28F 9/013 | 60/728 |
| 2015/0152737 A1 * | 6/2015 | Liang ...................... F01D 5/187 | 416/96 R |
| 2015/0198380 A1 * | 7/2015 | Haj-Hariri ................ B64G 1/50 | 62/3.2 |
| 2015/0204197 A1 * | 7/2015 | Lee ......................... F01D 5/187 | 416/97 R |
| 2015/0218962 A1 * | 8/2015 | Weber ...................... B22C 9/24 | 415/175 |
| 2016/0084167 A1 * | 3/2016 | Birnkrant .................. F02C 7/20 | 60/754 |
| 2016/0108740 A1 * | 4/2016 | Srinivasan ............. F01D 5/188 | 60/806 |
| 2016/0123230 A1 * | 5/2016 | Thomas ................. F28D 1/0358 | 60/772 |

(56) References Cited

U.S. PATENT DOCUMENTS

2016/0169016 A1* 6/2016 Blaney .................... F01D 9/065
                                                    415/115
2016/0177751 A1* 6/2016 Otomo ..................... F01D 5/02
                                                    60/805
2016/0201914 A1* 7/2016 Drake ...................... F02C 7/24
                                                    60/782
2016/0208704 A1* 7/2016 Bouldin .................. F23R 3/002
2016/0215628 A1* 7/2016 Spangler ................ F01D 5/147
2017/0067700 A1* 3/2017 Sugama ............... B23K 1/0012
2017/0328279 A1* 11/2017 Sennoun .................. F02C 7/14

FOREIGN PATENT DOCUMENTS

FR          2988822 A1    10/2013
WO      WO 9703281 A1 *   1/1997  .............. F02C 7/185

* cited by examiner

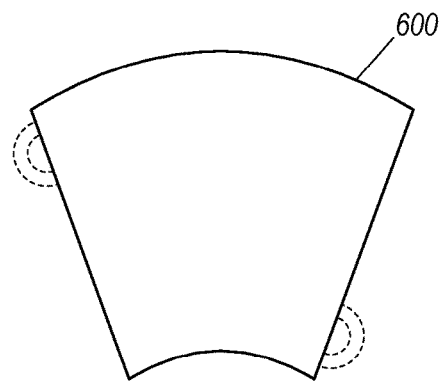
FIG. 6
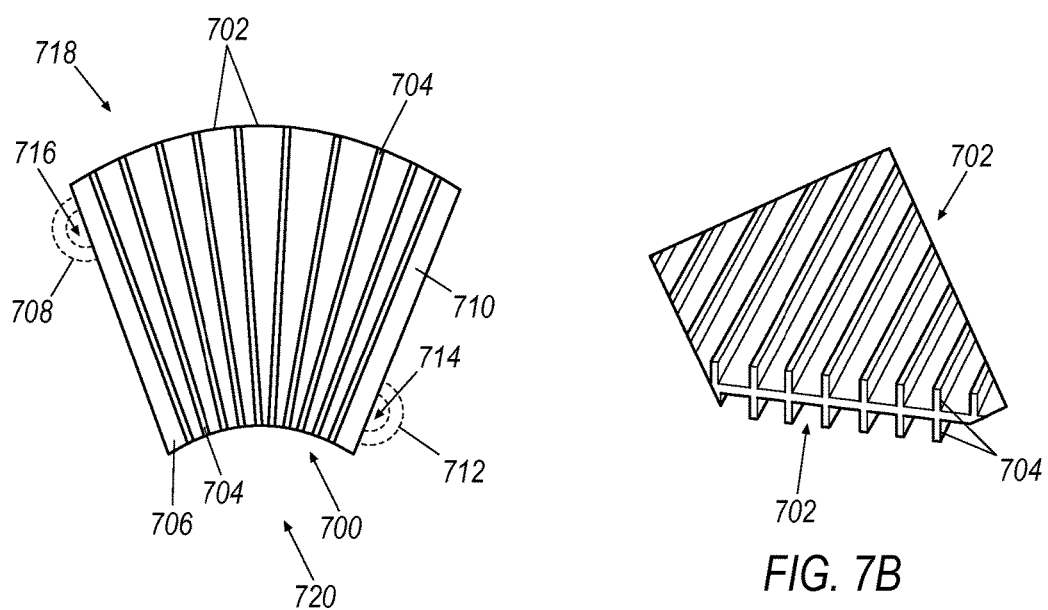
FIG. 7A
FIG. 7B

SINGLE PHASE MICRO/MINI CHANNEL HEAT EXCHANGERS FOR GAS TURBINE INTERCOOLING

CROSS-REFERENCE TO RELATED APPLICATIONS

This application claims priority to U.S. Provisional Patent Application No. 61/943,035, filed Feb. 21, 2014, the contents of which are hereby incorporated in their entirety.

FIELD OF TECHNOLOGY

An improved heat exchanger for use in a gas turbine engine is disclosed.

BACKGROUND

Heat exchangers can be employed in the gas turbine engine sector (e.g., the aerospace sector) for the purpose of transferring heat between a core air stream and a bypass stream. Air-to-air type heat exchangers have been explored for this purpose. Such heat exchangers may be configured to serve as an intercooler or as a bypass duct heat exchanger. These types of heat exchangers, however, can require complex ducting that adds system weight and costs. Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 6 illustrates an exemplary MWCHX sealing layer according to an embodiment;

FIG. 7A illustrates an exemplary MWCHX air-passage layer according to an embodiment; and FIG. 7B illustrates a perspective view of a portion of the exemplary MWCHX air-passage layer of FIG. 7B according to an embodiment.

DETAILED DESCRIPTION

An exemplary gas turbine engine heat exchange system includes a first multi-width channel heat exchanger (MWCHX) configured to transfer heat between a first air stream and a heat transfer fluid. The first MWCHX includes a first plurality of air-passage mini-channels configured to allow passage of the first air stream therethrough, where each air-passage channel has an air-channel width and an air-channel length greater than the air-channel width. The MWCHX may also include a first plurality of heat transfer fluid channels configured to allow passage of the heat transfer fluid therethrough, where each heat transfer fluid channel has a heat transfer channel width and a heat transfer channel length greater than the heat transfer channel width.

Figure 1:
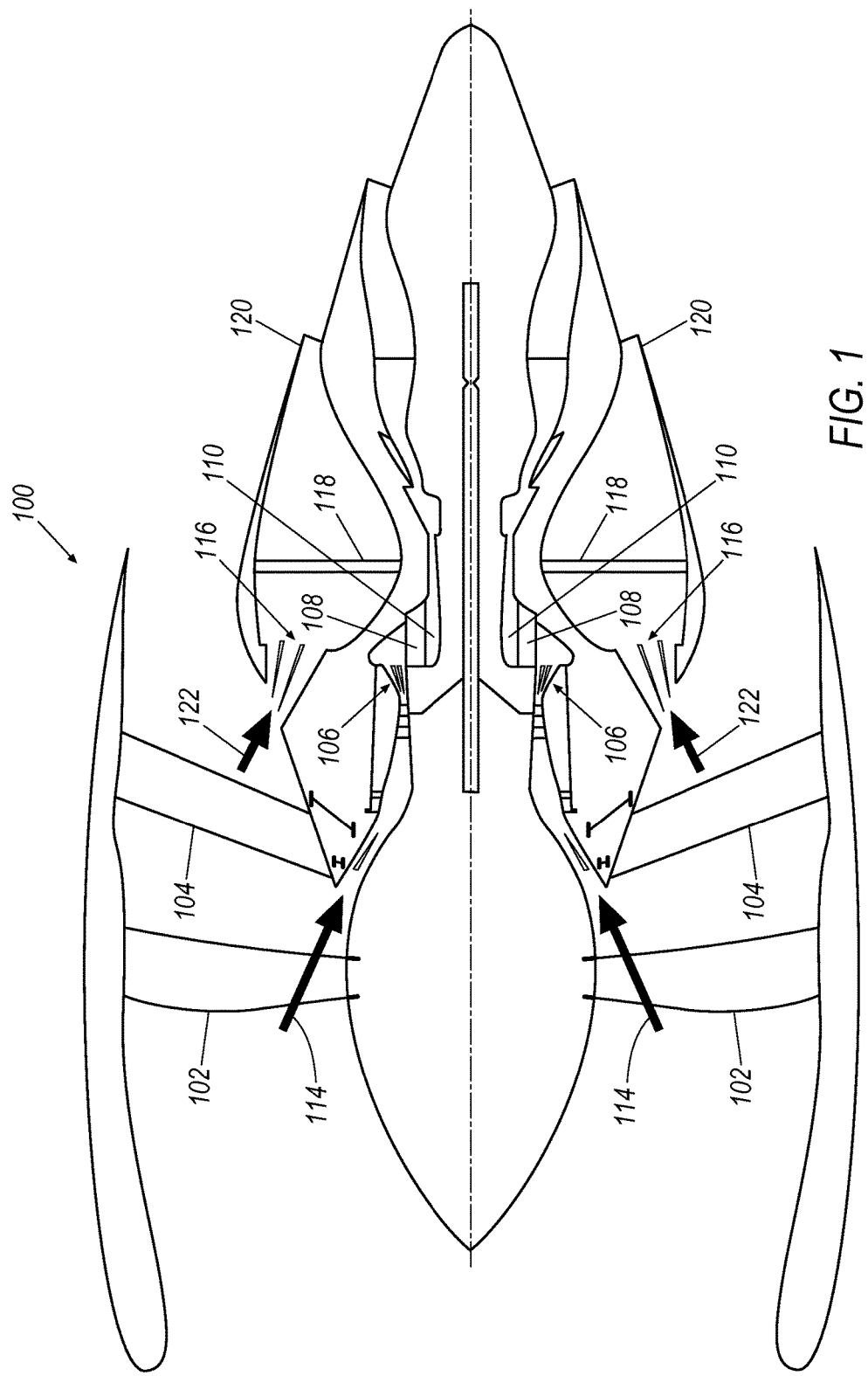
FIG. 1 illustrates an exemplary gas turbine.

FIG. 1 illustrates an exemplary gas turbine engine 100, which includes a fan 102, strut/exit guide vane 104, a core stream diffuser 106, an intercooler-type multi-width channel heat exchanger (MWCHX) 108, and a high pressure compressor nozzle 110. Ambient air enters past the fan 102 and is directed past the core stream diffuser 106 as a core air stream 114 that proceeds through the intercooler-type MWCHX 108 where it is cooled.

The gas turbine engine 100 also includes a bypass stream diffuser 116, a bypass duct-type MWCHX 118, and an exit nozzle 120. Ambient air in the form of a bypass air stream 122 proceeds past the bypass stream diffuser 116 to the bypass duct-type MWCHX 118, and passes through the bypass duct-type MWCHX 118 where the bypass air stream 122 is heated before exiting the exit nozzle 120. As will be discussed in detail below with respect to FIG. 2, according to an embodiment, a heat transfer fluid (not shown) that passes through the intercooler-type MWCHX 108 of FIG. 1 also passes through the bypass duct-type MWCHX 118. Accordingly, the core air stream 114 heats the heat transfer fluid in the intercooler-type MWCHX 108 while the bypass air stream 122 cools the heat transfer fluid in the bypass duct-type MWCHX 118. In other words, heat is transferred from the core air stream 114 to the heat transfer fluid in the intercooler-type MWCHX 108 and then as the heat transfer fluid passes through the bypass duct-type MWCHX 118 the heat is transferred from the heat transfer fluid to the bypass air stream 122.

Further details regarding the intercooler-type MWCHX 108 and the bypass duct-type MWCHX 118 will be set forth below with respect to FIGS. 2-7.

Figure 2:
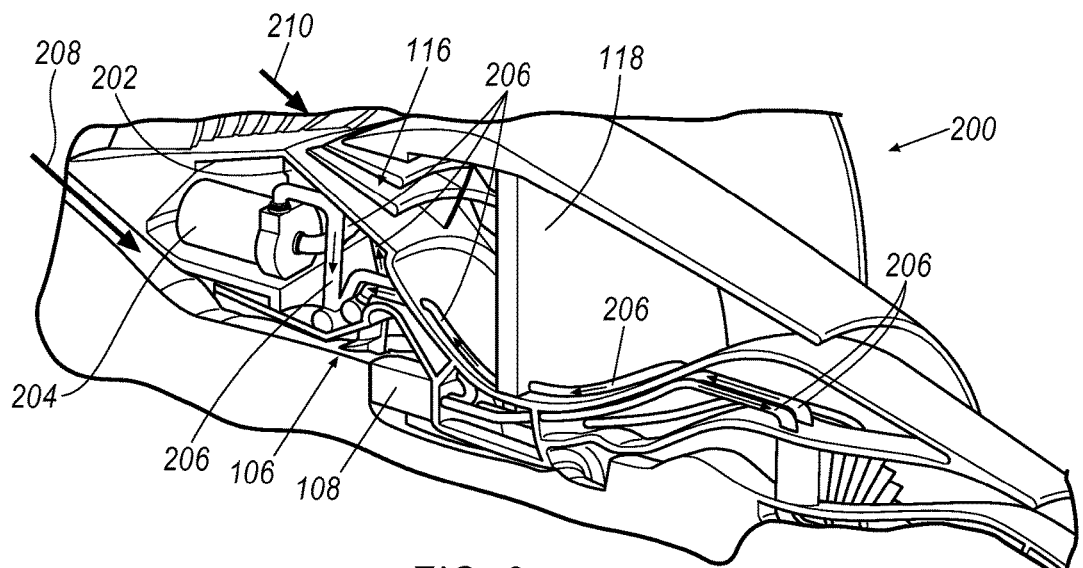
FIG. 2 illustrates an exemplary multi-width channel heat exchange system according to an embodiment.

With reference now to FIG. 2, a detailed view 200 of a portion of gas turbine engine 100 of FIG. 1 employing a multi-width channel heat exchange system is shown according to an embodiment. The portions of the gas turbine engine 100 set forth in both FIGS. 1 and 2 include the intercooler-type MWCHX 108, the bypass duct-type MWCHX 118, the core stream diffuser 106, and the bypass stream diffuser 116. FIG. 2 also depicts an accumulator/separator 202, a liquid pump 204, and a series of heat transfer fluid piping 206.

According to an embodiment, a core air stream 208 passes through the core stream diffuser 106 and through the intercooler-type MWCHX 108. As the core air stream 208 passes though the intercooler-type MWCHX 108, a heat transfer fluid (not shown) passing through the intercooler-type MWCHX 108 acquires heat from the core air stream 208. The intercooler-type MWCHX 108 is configured to serve as a non-evaporative or non-boiling heat exchanger. It is noted that though the intercooler-type MWCHX 108 serves as a non-evaporative or non-boiling (non-phase changing) heat exchanger, nominal evaporation or boiling may occur.

According to the present embodiment, after passing through the intercooler-type MWCHX 108, the heat transfer fluid then passes via the series of heat transfer fluid piping 206 as a high pressure liquid to a valve (not shown). The heat transfer fluid is then conveyed via the series of heat transfer fluid piping 206 to the bypass duct-type MWCHX 118. The bypass duct-type MWCHX 118 then transfers heat from the heat transfer fluid to a bypass air stream 210 that passes through the bypass duct-type MWCHX 118 via the bypass stream diffuser 116. As with the intercooler-type MWCHX 108, the bypass duct-type MWCHX 118 is also configured as a non-phase changing heat exchanger though nominal condensation may occur.

Accordingly, heat has been transferred from the core air stream 208 to the bypass air stream 210 via the heat transfer fluid.

After the heat transfer fluid passes through the bypass duct-type MWCHX 118, the heat transfer fluid is then conveyed via the series of heat transfer fluid piping 206 to the accumulator/separator 202, then to the liquid pump 204, and then again to the intercooler-type MWCHX 108. As will be appreciated, piping configurations different than the configuration of the series of heat transfer fluid piping 206 shown in FIG. 2 may be employed to couple together two MWCHXs such as intercooler-type MWCHX 108 and bypass duct-type MWCHX 118.

By employing a heat exchange or management system having the intercooler-type MWCHX 108 functionally or fluidly connected to the bypass duct-type MWCHX 118 as shown in FIG. 2, heavy and complex ducting often required for air-to-air heat exchange systems can be avoided or at least minimized.

Figure 3A:
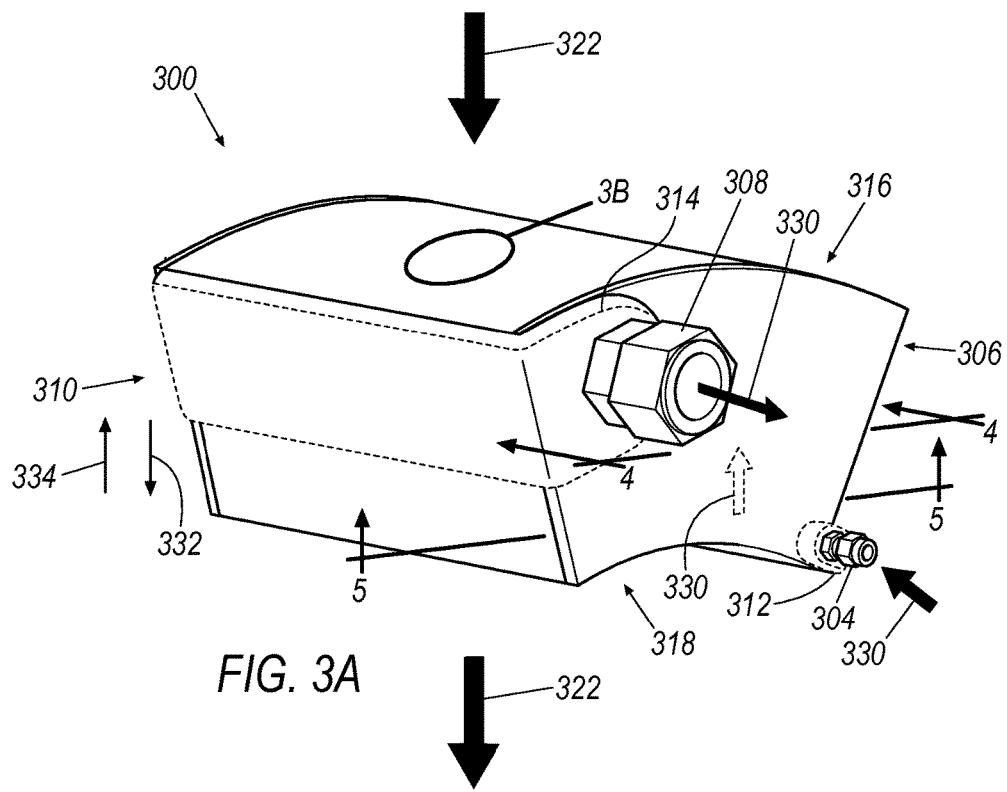
FIG. 3A illustrates an exemplary multi-width channel heat exchanger (MWCHX) according to an embodiment.
Figure 3B:
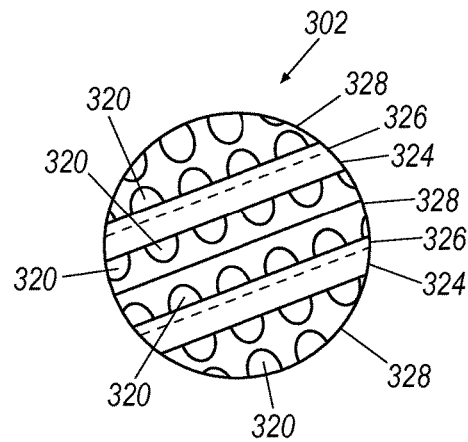
FIG. 3B illustrates an exaggerated view of a region of the exemplary MWCHX of FIG. 3A according to an embodiment.

Turning now to FIGS. 3A-3B, a MWCHX 300 and an exaggerated view 302 of a portion thereof are shown according to an embodiment. The MWCHX 300 includes a heat transfer fluid inlet 304 on a front side 306 and a heat transfer fluid outlet 308 on a back side 310. It is noted, that according to other embodiments, the outlet 308 may be on the front side 306 rather than the back side 310. Alternatively, the outlet 308 may remain on the back side 310, while the inlet 304 is instead also positioned on the back side 310. Indeed, according to embodiments, the outlet 308 and inlet 304 may be on any side of the MWCHX 300.

Referring to the present embodiment, MWCHX 300 has an external intake manifold 312 and an external outtake manifold 314, where each is shown in phantom. It is contemplated, however, that instead of employing external intake and outtake manifolds 312, 314, respectively, internal intake and outtake manifolds (not shown) may be employed. Referring back to the present embodiment, the MWCHX 300 also includes a top side 316 and a bottom side 318.

The exaggerated view 302 of FIG. 3B is of region 3B on the top side 316 of the MWCHX 300 shown in FIG. 3A. As illustrated in the exaggerated view 302, the top side 316 includes a plurality of air-passage channels 320. These air-passage channels 320 are mini-channels and extend through the MWCHX 300 from the top side 316 to the bottom side 318. The air-passage channels 320 are configured to allow air 322 to pass through the MWCHX 300. That is, the air-passage channels 320 are configured to allow air 322 to enter the top side 316 of the MWCHX 300 and exit through the bottom side 318 of the MWCHX 300. Further information regarding the plurality of air-passage channels 320 will be set forth in detail below with respect to FIGS. 4 and 7A-B.

The exaggerated view 302 of FIG. 3B also illustrates that the MWCHX 300 is comprised of a plurality of layers. The layers include a plurality of heat transfer fluid layers 324, a plurality of sealing layers 326, and a plurality of air-passage layers 328 that includes the plurality of air-passage channels 320. Each layer 324-328 extends from the top side 316 of the MWCHX 300 to the bottom side 318 of the MWCHX 300. It is contemplated that these layers 324-328 include nickel, titanium, and/or aluminum alloys.

According to an embodiment, a heat transfer fluid 330 enters the MWCHX 300 via the inlet 304 into the external intake manifold 312, passes through the heat transfer fluid layers 324 that run parallel with the air-passage channels 320 of the air-passage layers 328, through the external outtake manifold 314, and then out the outlet 308. The heat transfer fluid 330 may be a wide variety of liquids or gasses. For example, if the MWCHX 300 is implemented as an intercooler, the heat transfer fluid 330 may, for example, be a high pressure transfer fluid (HTF) being a pure fluid or a mixture. Further, the HTF may contain particles to enhance heat transfer (e.g., a nano-fluid). On the other hand, if the MWCHX 300 is implemented as a bypass duct HX, the heat transfer fluid 330 may, for example, be a high or low pressure heat transfer fluid such as water and anti-freeze mixture.

The MWCHX 300 is generally a counter flow-type heat exchanger. That is, as air 322, such as a core stream or a bypass stream, moves through the MWCHX 300 via the air-passage channels 320 in a first direction 332, heat is transferred between the air 322 and the heat transfer fluid 330 that is moving in a second direction 334 that is opposite the first direction 332. Accordingly, an efficient heat transfer occurs between the air 322 in the air-passage channels 320 and the heat transfer fluid 330 moving in an opposite direction in the heat transfer fluid layers 324.

If the MWCHX 300 functions as an intercooler, the air 322 entering the top side 316 of the MWCHX 300 is warmer than the heat transfer fluid 330 entering the inlet 304. As such, heat is transferred from the air 322 to the heat transfer fluid 330 as each travel in opposite directions through the MWCHX 300.

Alternatively, the MWCHX 300 may be configured to serve as a bypass duct-type MWCHX. According to such an embodiment, the heat transfer fluid 330 passes heat to the air 322 as the heat transfer fluid 330 passes through the heat transfer fluid layers 324.

It is noted that the saddle shape of the MWCHX 300 depicted in FIG. 3A may be beneficial in a variety of applications. For example, MWCHX 300 may be an intercooler-type heat exchanger that may be fit between an intermediate pressure compressor and a high pressure compressor in a three spool high bypass turban engine. It another example, it may fit between a fan boosted with LP compressor stages and a high pressure compressor in a two spool high bypass turbofan engine. It is noted, however, that embodiments are not dictated by the shape of the MWCHX 300 shown in FIG. 3A. That is, alternate embodiments may employ other shapes that also employ mini-channel air-passages and mini-channel or micro-channel heat transfer fluid layers. Further, embodiments may also be implemented in applications other than two or three spool applications, such as a single spool (shaft) application.

Figure 4:
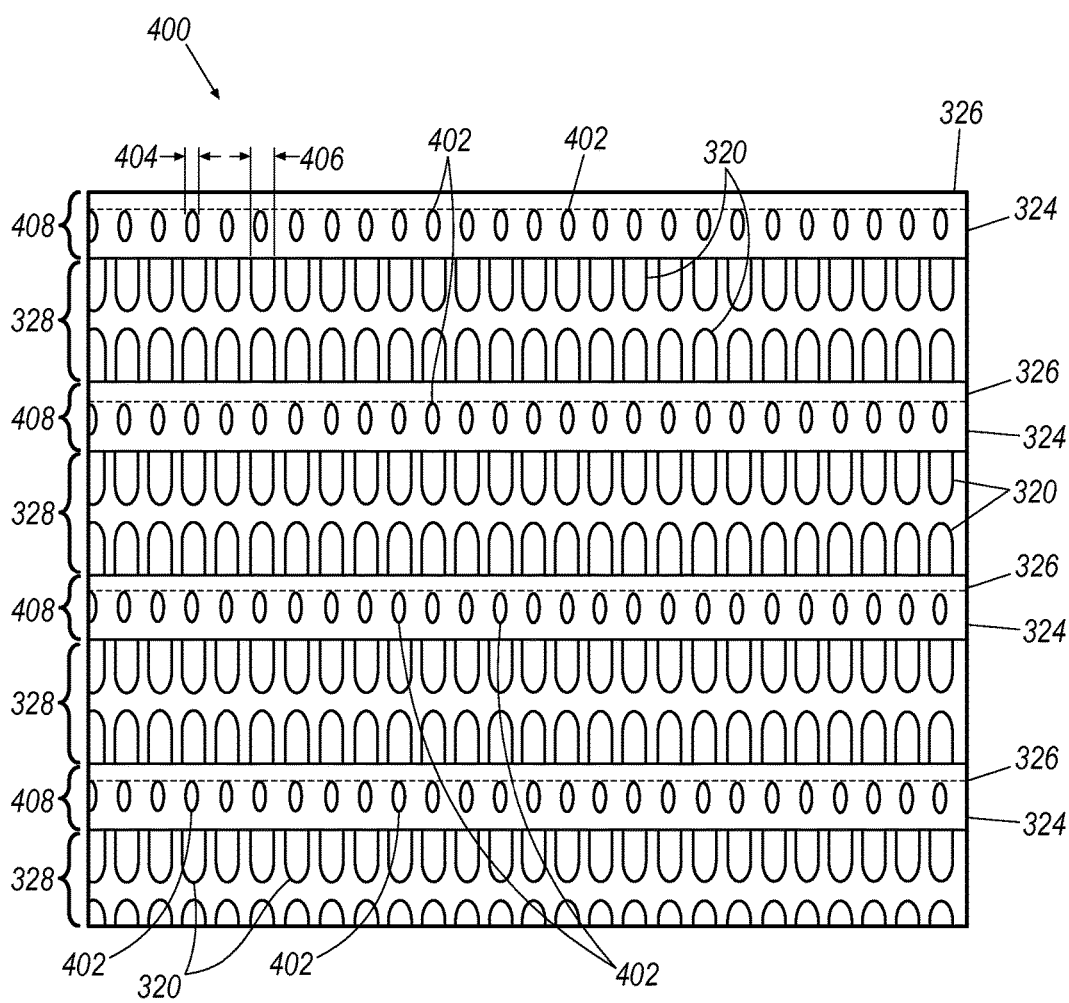
FIG. 4 illustrates a partial cross-sectional view of FIG. 3A along 4-4 according to an embodiment.

Referring now to FIG. 4, a partial cross-sectional view 400 of the MWCHX 300 of FIG. 3A along 4-4 is shown according to an embodiment. That is, only a portion of the cross-section along 4-4 is shown. As seen in FIG. 4, the plurality of the heat transfer fluid layers 324, the plurality of the sealing layers 326, and the plurality of the air-passage layers 328, each depicted in FIG. 3B, are also depicted in FIG. 4. Each of the heat transfer fluid layers 324 includes a plurality of heat transfer fluid channels 402 and each of the air-passage layers 328 includes the plurality of the air-passage channels 320. As air (not shown) passes through the air-passage channels 320, heat is transferred between the air and the heat transfer fluid (not shown) that is passing in the opposite direction through the heat transfer fluid channels 402.

Each heat transfer fluid channel of the heat transfer fluid channels 402 are at a heat transfer channel width 404 while each air-passage channel of the air-passage channels 320 are at an air-channel width 406. According to embodiments, the heat transfer channel width 404 is less than the air-channel width 406. The heat transfer channel width 404 (i.e., wall-to-wall dimension) generally ranges from 0.005 inches to 0.020 inches. The air-passage channels 320, on the other hand, are larger mini-channels and the sizes or wall-to-wall dimension generally range from 0.015 inches to 0.080 inches.

It is contemplated that during manufacturing, the layers 324-328 are bonded together by diffusion bonding or brazing. Accordingly, boundaries between the layers are generally indistinguishable.

Further, it is contemplated that during manufacturing, a plurality of heat transfer/sealing sets 408 are created via diffusion bonding or brazing. That is, each of the heat transfer fluid layers 324 is respectively diffusion bonded or brazed to each of sealing layers 326 (or the heat transfer fluid channels 402 thereof) to form the plurality of heat transfer/sealing sets 408. According to an embodiment, the sealing layers 326 are un-etched, and each effectively creates a seal over the heat transfer fluid layer 324 while leaving the heat transfer fluid channels 402 of the sets 408 open for heat transfer fluid flow.

These heat transfer/sealing sets 408 have a high structural integrity since they, in some aspects, act as a pressure vessel for the high pressure heat transfer fluid that flows therethrough. Due to the inner dimensions of the heat transfer fluid channels 402, each of the heat transfer/sealing sets 408 accommodate a high pressure of heat transfer fluid without a corresponding high stress in each of the heat transfer/sealing sets 408 due to the low value of Pr/t stress, where "P" is internal pressure, "r" is channel diameter, and "t" is channel wall thickness.

After the sets 408 are created, each is respectively diffusion bonded or brazed to each of the air-passage layers 328. In other words, each of the air-passage layers 328 is sandwiched between two of the heat transfer/sealing sets 408. It is noted that alternate configurations are contemplated. For example, two or more air passage layers (not shown) may be sandwiched in between heat transfer layers.

According to an embodiment where the MWCHX, such as MWCHX 300, is configured as an intercooler in a turbofan environment, eight of the MWCHXs 300 may be employed, each having forty-three air-passage layers 328 with each air-passage channel 320 thereof having a dimension of 0.035-057 inches by 0.0225 inches. Each of the eight MWCHXs 300 would also employ forty-two heat transfer/sealing sets 408 with the sets 408 being approximately 0.020 inches thick. In such an embodiment, each of the heat transfer/sealing sets 408 may have an approximately 0.005 inch thick un-etched sealing layer 326 and an approximately 0.015 inch thick heat transfer fluid layer 324. The etch depth of the heat transfer fluid channels 402 may be approximately 0.010 inches. It is noted that the dimensions set forth directly above are merely dimensions of an embodiment. As such, other dimensions may be employed that are within ranges set forth in this disclosure.

Figure 5:
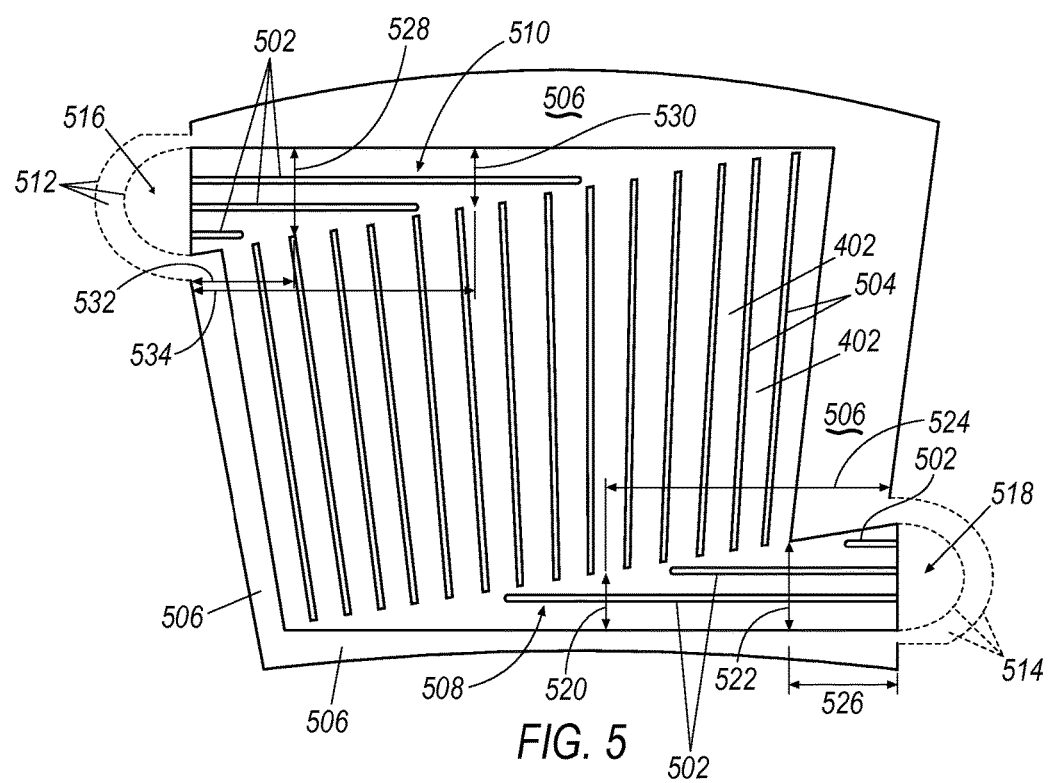
FIG. 5 illustrates a cross-sectional view of FIG. 3A along 5-5 according to an embodiment.

With reference now to FIG. 5, a cross-sectional view of the MWCHX 300 of FIG. 3A along 5-5 is shown according to an embodiment. The cross-sectional view shown in FIG. 5 depicts a single heat transfer fluid layer 500, such as one of the heat transfer fluid layers 324 of FIGS. 3A-4. The single heat transfer fluid layer 500 of FIG. 5 includes the plurality of heat transfer fluid channels 402, a plurality of support rises 502, a plurality of substrate rises 504, a substrate perimeter 506, and an internal intake and outtake manifolds 508, 510, respectively, around the support rises 502. The internal intake and outtake manifold 508, 510 are generally the same depth as the heat transfer fluid channels 402. An upper and lower portion 512, 514 (respectively shown in phantom) of the respective external outtake and intake manifolds 314, 312 of FIG. 3 are also shown. With continued reference to FIG. 5, it is noted that the support rises 502, substrate rises 504, substrate perimeter 506, and the upper and lower portions 512, 514, respectively, are generally at the same height.

FIG. 5 also depicts an external outtake manifold void 516 and an external intake manifold void 518. It is noted that according to an embodiment, external intake and outtake manifolds are not required since the internal intake manifold 508 and the internal outtake manifold 510 may be all that is needed to accommodate the transfer of the heat transfer fluid.

According to the present embodiment, the single heat transfer fluid layer 500 is configured to allow a heat transfer fluid to enter from the external intake manifold void 518 into the internal intake manifold 508 around the support rises 502 therein and pass into the plurality of heat transfer fluid channels 402. It is contemplated that the heat transfer fluid may be a mixture such as a water-ammonia mixture. The heat transfer fluid passes through the heat transfer fluid channels 402 and enters the internal outtake manifold 510 where it passes around the support rises 502 therein and out the external outtake manifold void 516.

A first intake width 520 and a second intake width 522, each of the internal intake manifolds 508, are shown. The first intake width 520 is at a first intake distance 524 from the external intake manifold void 518 while the second intake width 522 is at a second intake distance 526 from the external intake manifold void 518. As shown in FIG. 5, the first intake width 520 is less than the second intake width 522 and the first intake distance 524 is less than the second intake distance 526. The general dimensions and shape of the internal intake manifold are configured to aid in the flow of the heat transfer fluid into the heat transfer fluid channels 402. Though the internal intake manifold 508 of the present embodiment has a general triangular shape, other shapes of the internal intake manifold are envisioned.

Similar to the internal intake manifold 508, a first outtake width 528 and a second outtake width 530 of the internal outtake manifold 510 are shown. Further, a first outtake distance 532 and a second outtake distance 534 greater than the first outtake distance 532 are shown. The dimensions and general shape of the internal outtake manifold 510 are configured to aid the flow of the heat transfer fluid into the external outtake manifold void 516. Though the internal outtake manifold 510 has a general triangular shape, other shapes of internal intake manifolds are envisioned.

It is noted that the area of the internal intake manifold 508 is generally the same as the internal outtake manifold 510 according to the present embodiment.

With continued reference to FIG. 5, the arrangement of the support rises 502 shown is configured to aid the flow of the heat transfer fluid. For example, the arrangement of the support rises 502 in the internal intake manifold 508 aides in the distribution of the heat transfer fluid into the heat transfer fluid channels 402. Likewise, the arrangement of the support rises 502 in the upper heat transfer fluid region 510 aides in the transfer of the heat transfer fluid out of the heat transfer fluid channels 402 and into the external outtake manifold void 516.

The size of the heat transfer fluid channels 402 generally ranges from 0.005 inches. to 0.020 inches, which for most of the range are dimensions generally considered to be less than mini-channel dimensions The single heat transfer fluid layer 500 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing of the single heat transfer fluid layer 500, the design of the single heat transfer fluid layer 500 is easily configurable. For example, though not shown, the design artwork may be relatively easily modified to employ support rises that are a different shape than those shown in FIG. 5. It is the use of the resist, mask, expose, develop, and electrochemical etching/machining processes employed in the printed circuit board sector that make the design art work easily configurable.

It is noted that embodiments are not dictated by the saddle shape shown in FIG. 5. That is, heat transfer fluid layers may take on shapes other than a saddle shape.

Referring now to FIG. 6, a sealing layer 600 is shown according to an embodiment. As discussed above with respect to FIG. 4, it is contemplated that each heat transfer fluid layer (e.g., single heat transfer fluid layer 500 of FIG. 5) is bonded to a sealing layer (e.g., the sealing layer 326 of FIG. 4), thus creating a heat transfer sealing set such as heat transfer/sealing set 408 of FIG. 4. Accordingly, the sealing layer 600 of FIG. 6 is configured to have generally the same footprint as the heat transfer fluid layer (e.g., the heat transfer fluid layer 500 of FIG. 5). The sealing layer 600 is bonded via diffusion bonding or brazing to the raised substrate of the heat transfer fluid layer. For example, with reference to FIGS. 5 and 6, the sealing layer 600 is bonded to the substrate rises 504, the substrate perimeter 506, the support rises 502, and the upper and lower portions of the respective external outtake and intake manifolds 512, 514 of the single heat transfer fluid layer 500. Since neither the heat transfer fluid channels 402 nor the internal outtake and intake manifolds 510, 508, respectively, around the support rises 502 are bonded to the sealing layer 600, the heat transfer fluid is allowed to move into the internal intake manifold 508 via the external intake manifold void 518, then into the heat transfer fluid channels 402, out into the internal outtake manifold 510, and then out through the external outtake manifold void 516. It is noted that since the support rises 502 (regardless of shape) are bonded to the sealing sheet or layer 600, the heat transfer/sealing set, such as heat transfer/sealing set 408 of FIG. 4, has added structural integrity to accommodate HTFs or other heat transfer fluids.

Further, it is noted that embodiments are not dictated by the saddle shape shown in FIG. 6. That is, sealing layers may take on shapes other than a saddle shape.

With reference now to FIG. 7A, an air-passage layer 700 is shown according to an embodiment. The air-passage layer 700 includes a plurality of air-passage channels 702, a plurality of air-passage substrate rises 704, a first substrate perimeter 706, a portion of external outtake manifold region 708 (shown in phantom), a second substrate perimeter 710, and a portion of an external intake manifold region 712 (shown in phantom). Further, FIG. 7A also depicts a portion of an external intake manifold void 714 and an external outtake manifold void 716.

Though not shown, it is contemplated that the manifolds may be integrated into the substrate perimeters 706, 710. As such, according to an embodiment, air-passage layer 706 would be free of external intake manifold 712 and external outtake manifold 708. In such an embodiment, an outtake manifold void (not shown) would be etched into first substrate perimeter 706 and an intake manifold void (not shown) would be etched into second substrate perimeter 712.

It is noted that the air-passage channels 702 and the air-passage substrate rises 704 extend from a top end 718 of the air-passage layer 700 to a bottom end 720 of the air-passage layer 700. Further, according to the present embodiment, the air-passage channels 702 generally converge at the bottom end 720 relative to the top end 718. As such, the convergence compensates for any loss of air stream velocity through the air-passage channels 702 due to cooling if a heat transfer from the air to the heat transfer fluid is occurring. Other embodiments, however, are envisioned having convergence instead on the top end 718 or no convergence at all.

The air-passage substrate rises 704, first and second perimeters 706, 710, and the portions of the external outtake and intake manifolds 708, 712 are generally at the same height. Accordingly, these areas 704-712 are diffusion bonded or brazed to respective heat transfer/sealing sets 408 of FIG. 4 during manufacture.

The air-passage channels 702 of FIG. 7A have an inner dimension (e.g., width 406 of FIG. 4) and generally range from 0.015 inches to 0.080 inches.

The small features of the of the air-passage channels 702 enable a large air surface area of the air-passage layer 700 so that the product of the heat transfer coefficient times the surface area (i.e., the HA product) can be generally the same magnitude as the heat transfer fluid layer (e.g., heat transfer/sealing sets 408). Accordingly, an MWCHX (e.g., intercooler-type MWCHX 108 and bypass duct-type MWCHX 118, each of FIGS. 1 and 2, and MWCHX 300 of FIG. 3) can be a fraction of the volume of a conventional plate-fin heat exchanger (not shown) with generally equivalent performance (e.g., air pressure loss and thermal efficiency).

The air-passage layer 700 is manufactured by a process that combines portions of printed circuit board manufacturing (e.g., masking, ultraviolet exposure, and mask development) with electrochemical machining/etching in sheet metal. With regards to the etching, isotropic or anisotropic etching may be employed.

Due to the manner of manufacturing the air-passage layer 700, the design thereof is configurable. As such, the dimensions of the air-passage channels 702 can be readily manipulated within an acceptable range by modifying the design art work. It is noted that FIG. 7A depicts straight air-passage channels 702. As such, an air stream can pass straight through, thus minimizing pressure loss. Further, it is noted that embodiments are not dictated by the saddle shape shown in FIG. 7A. That is, air-passage layers may take shapes other than a saddle shape.

Referring now to FIGS. 7A and 7B, where FIG. 7B depicts a perspective view of a portion of air-passage layer 700 according to an embodiment. FIG. 7B illustrates that it is contemplated that the air-passage channels 702 and the air-passage substrate rises 704 are on both sides of air-passage layer 700.

According to the embodiments, MWCHXs such as MWCHX 108 and 118, both of FIGS. 1 and 2, and MWCHX 300 of FIG. 3 employ multi-width channels. In other words, the heat transfer channels (e.g., heat transfer fluid channels 402 of FIG. 4) have a smaller inner diameter or width than the mini-channels (e.g., air-passage channels 320 of FIG. 4) of the air-passage layers. Such MWCHXs have a high level or porosity, where porosity is a total void volume (i.e., the sum of each manifold volume and each passage or channel volume) over the total MWCHX volume. Whereas a typical heat exchanger (not shown) may have a porosity in the range from twenty to thirty percent, embodiments of the MWCHX discussed in detail herein may have a porosity in the range of thirty to seventy percent.

The MWCHXs (i.e., MCHWXs 108 and 118 both of FIGS. 1 and 2, and 300 of FIG. 3) and the embodiments thereof discussed in detail above, whether they are of the intercooler or bypass duct-type MWCHXs, have the advantages of having a small size and weight for a given thermal effectiveness and pressure drop. As discussed above, they have a high porosity. Accordingly, these types of MWCHXs can be utilized in applications that have tight size and weight requirements. For example, the MWCHXs discussed above and the embodiments thereof can be utilized in aerospace application where size and weight requirements need to be met. Further, since an intermediate fluid is utilized (e.g., heat transfer fluid 330 of FIG. 3A), the need for heavy and complex ducting often needed for air-to-air type heat exchangers can be avoided.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine heat exchange system comprising a first multi-width channel heat exchanger (MWCHX) configured to transfer heat between a first air stream and a heat transfer fluid, wherein the first MWCHX comprises:
    a plurality of air-passage mini-channels configured to allow passage of the first air stream therethrough, wherein each air-passage channel of the plurality of air-passage mini-channels has an air-channel width and an air-channel length greater than the air-channel width;
    a heat transfer fluid inlet fitting and a heat transfer fluid outlet fitting on a side of the first MWCHX;
    a plurality of heat transfer fluid channels configured to allow passage of the heat transfer fluid from the heat transfer fluid inlet fitting to the heat transfer fluid outlet fitting, wherein each heat transfer fluid channel of the plurality of heat transfer fluid channels has a heat transfer channel width and a heat transfer channel length greater than the heat transfer channel width, and wherein the heat transfer channel width is less than the air-channel width; and
    a plurality of elongated sealing sets respectively including the plurality of heat transfer fluid channels and a plurality of sealing layers, the plurality of sealing layers being diffusion bonded to the plurality of heat transfer fluid channels, the plurality of elongated sealing sets spanning transverse to the air-passage channels of the plurality of air-passage mini-channels, the plurality of elongated sealing sets being arranged in rows interposed by respective spaces to expose a portion of at least two rows of the plurality of air-passage mini-channels to the first air stream, and the plurality of air-passage mini-channels being substantially parallel with the plurality of heat transfer fluid channels,
    wherein the first MWCHX is configured to have a first flow direction of the first air stream in the plurality of air-passage mini-channels that is substantially parallel with a second flow direction of the heat transfer fluid in the plurality of heat transfer fluid channels, and the plurality of air-passage mini-channels is arranged as air-passage layers in an annular arrangement about an engine axis.

2. The gas turbine engine heat exchange system of claim 1, wherein the air-passage layers each include opposing ends of the at least two rows of the plurality of air-passage mini-channels, a first circumferential row of the plurality of air-passage mini-channels is on a first side of a first one of the air-passage layers and a second circumferential row of the plurality of air-passage mini-channels is on a second side of the first one of the air-passage layers, and wherein the plurality of air-passage mini-channels of the first and second circumferential rows are electrochemically etched.

3. The gas turbine engine heat exchange system of claim 2, wherein the first and second rows of air-passage mini-channels converge at a first end opposite a second end of the one of the air-passage layers.

4. The gas turbine engine heat exchange system of claim 2, wherein the air-channel width is no less than 0.015 inches and no more than 0.080 inches, and wherein the heat transfer channel width is no less than 0.005 inches and no more than 0.020 inches.

5. The gas turbine engine heat exchange system of claim 4, wherein the first MWCHX is a non-phase changing heat exchanger and the heat transfer fluid includes a water and anti-freeze mixture, and wherein the first MWCHX is configured to have the first air stream flow in a transverse direction to a flow of the heat transfer fluid such that the first air stream enters a top surface of the first MWCHX and exits a bottom surface of the first MWCHX while the heater transfer fluid enters the heat transfer fluid inlet fitting on an upper portion of the side of the first MWCHX and exits the heat transfer fluid outlet fitting on a lower portion of the side of the first MWCHX.

6. The gas turbine engine heat exchange system of claim 2, further comprising a second MWCHX functionally connected with the first MWCHX, wherein the second MWCHX comprises:
    a plurality of air-passage layers, wherein each air-passage layer of the plurality of air-passage layers includes a second plurality of air-passage mini-channels configured to allow passage of a bypass air stream therethrough; and
    a plurality of heat transfer fluid layers, wherein each heat transfer fluid layer of the plurality of heat transfer fluid layers includes a second plurality of heat transfer fluid channels configured to allow the passage of the heat transfer fluid therethrough, and wherein the gas turbine engine heat exchange system is configured to transport a quantity of heat from the first air stream to the bypass air stream.

7. The gas turbine engine heat exchange system of claim 6, wherein each heat transfer fluid channel of the second plurality of heat transfer fluid channels has a second heat transfer channel width and a second heat transfer channel length greater than the second heat transfer channel width, and wherein the second heat transfer channel width is less than the air-channel width.

8. The gas turbine engine heat exchange system of claim 1, wherein sets of the plurality of elongated sealing sets are spaced apart from each other by the respective spaces and positioned over respective rows of the plurality of air-passage mini-channels, and the first air stream is transverse to a top layer of the plurality of air passage mini-channels.

9. The gas turbine engine heat exchange system of claim 8, wherein each heat transfer and sealing layer set of the plurality of heat transfer and sealing layer sets comprises:
an etched internal intake manifold, wherein the etched internal intake manifold is configured to distribute the heat transfer fluid to the plurality of heat transfer fluid channels; and
an etched internal outtake manifold, wherein the etched internal outtake manifold is configured to receive the heat transfer fluid from the plurality of heat transfer fluid channels.

10. The gas turbine engine heat exchange system of claim 9, further comprising an MWCHX outlet configured to allow the heat transfer fluid to pass out of the first MWCHX, wherein the etched internal outtake manifold has a first width at a first distance from the MWCHX outlet and a second width at a second distance from the MWCHX outlet further than the first distance, and wherein the first width is less than the second width, and wherein a plurality of elongated support risers are positioned within the second width of the etched internal outtake manifold.

11. A multi-width channel heat exchanger (MWCHX) system for a gas turbine engine, the MWCHX system comprising:
a first MWCHX having an upper portion and a lower portion, the first MWCHX comprising:
a first layer having a plurality of air-passage mini-channels configured to convey a first air stream through the first MWCHX in a first flow direction, wherein each air-passage mini-channel of the plurality air-passage mini-channels has an air-channel length and an air-channel width less than the air-channel length;
a second layer bonded to the first layer, the second layer having a plurality of heat transfer fluid channels configured to convey a heat transfer fluid through the first MWCHX in a second flow direction opposite the first flow direction, wherein each heat transfer fluid channel of the plurality of heat transfer fluid channels has a heat transfer channel length and a heat transfer channel width less than the heat transfer channel length, and wherein the heat transfer channel width is less than the air-channel width; and
a plurality of elongated sealing sets respectively including the plurality of heat transfer fluid channels and a plurality of sealing layers, the plurality of sealing layers being diffusion bonded to the plurality of heat transfer fluid channels, the plurality of elongated sealing sets spanning transverse to the air-channel length of the plurality of air-passage mini-channels, the plurality of elongated sealing sets being arranged in rows interposed by respective spaces to expose a portion of at least two rows of the plurality of air-passage mini-channels to the first air stream, and the plurality of air-passage mini-channels being substantially parallel with the plurality of heat transfer fluid channels,
wherein the plurality of heat transfer fluid layers, the plurality of sealing layers, and the plurality of air-passage mini-channels extend between the upper portion and the lower portion and
wherein the first flow direction of the first air stream in the plurality of air-passage mini-channels is substantially parallel with the second flow direction of the heat transfer fluid in the plurality of heat transfer fluid channels, and the plurality of air-passage mini-channels is arranged as air-passage layers in an annular arrangement about an engine axis.

12. The MWCHX system of claim 11, further comprising a second MWCHX fluidly coupled to the first MWCHX, the second MWCHX is configured to convey heat between a bypass air stream and the heat transfer fluid, and wherein the first air stream is a core air stream, and wherein the MWCHX system is configured to convey heat from the core air stream to the bypass air stream.

13. The MWCHX system of claim 11, wherein the plurality of heat transfer fluid channels have a smaller inner width than the plurality of air-passage mini-channels such that the first MWCHX has a porosity between 0.30 and 0.70, and wherein the porosity is a sum of void volumes in the first MWCHX divided by a total volume of the first MWCHX.

14. The MWCHX system claim 11, wherein the air-channel width is in a range of 0.015 inches to 0.080 inches, and wherein the heat transfer fluid channel width is in a range of 0.005 inches to 0.020 inches.

15. The MWCHX of claim 14, wherein the plurality of air-passage mini-channels converge at a first end of the first layer to converge the first air stream passing therethrough and are substantially parallel in the air passage layer.

16. The MWCHX system of claim 14, wherein the second layer of the first MWCHX further comprises:
an internal intake manifold electrochemically etched into the first layer, wherein the internal intake manifold is configured to convey the heat transfer fluid to the plurality of heat transfer fluid channels; and
an internal outtake manifold electrochemically etched into the first layer, wherein the internal outtake manifold is configured to receive the heat transfer fluid from the plurality of heat transfer fluid channels.

17. The MWCHX system of claim 16, wherein each air-passage mini-channel of the plurality of air-passage mini-channels and each heat transfer fluid channel of the plurality of heat transfer fluid channels is electrochemically etched.

18. A method of conveying a quantity of heat within a gas turbine engine comprising:
passing a gas turbine engine air stream through a plurality of etched mini-channel air passages of a first heat exchanger in a first flow direction, wherein each passage of the plurality of etched mini-channel air passages has a first air-channel wall and a second air-channel wall at an air-channel distance from each other; and
passing a heat transfer fluid through a plurality of etched heat transfer fluid passages of the first heat exchanger in a second flow direction opposite the first flow direction such that the quantity of heat is transferred between the heat transfer fluid and the air stream, wherein each passage of the plurality of etched heat transfer fluid passages has a first heat transfer channel wall and a second heat transfer channel wall at a heat transfer channel distance from each other, wherein the air-channel distance is greater than the heat transfer channel distance,
wherein a plurality of elongated sealing sets respectively includes the plurality of etched heat transfer fluid passages and a plurality of sealing layers, the plurality of sealing layers is diffusion bonded to the plurality of etched heat transfer fluid passages, the plurality of elongated sealing sets span transverse to the passages of the plurality of etched mini-channel air passages, the plurality of elongated sealing sets is arranged in rows interposed by respective spaces to expose a portion of at least two rows of the plurality of etched mini-channel air passages to the air stream, and the plurality of etched mini-channel air passages is substantially parallel with the plurality of etched heat transfer fluid passages, and wherein the first flow direction of the first air stream in the plurality of etched air-passage mini-channels is substantially parallel with the second flow direction of the heat transfer fluid in the plurality of heat transfer fluid channels, and the plurality of etched air-passage mini-channels is arranged as air-passage layers in an annular arrangement about the engine axis.

19. The method of claim 18, wherein the air-channel distance is one of a) 0.015 inches, b) 0.080 inches, and c) within a range of 0.015 inches to 0.080 inches, and
  wherein the heat transfer channel distance is one of a) 0.005 inches, b) 0.020 inches, and c) within a range of 0.005 inches to 0.020 inches.

20. The method of claim 19 further comprising:
  passing the heat transfer fluid through a plurality of etched heat transfer fluid passages of a second heat exchanger; and
  passing a second air stream through a plurality of etched air passages of a second heat exchanger to transfer a quantity of heat from the air stream to the second air stream.

* * * * *